United States Patent
Jeon et al.

(10) Patent No.: US 9,745,500 B2
(45) Date of Patent: Aug. 29, 2017

(54) METHOD FOR PRODUCING DRILLING FLUID FROM BIOMASS-DERIVED OILS

(71) Applicants: SK INNOVATION CO., LTD., Seoul (KR); SK LUBRICANTS CO., LTD., Seoul (KR)

(72) Inventors: Hee Jung Jeon, Daejeon (KR); Jong Su Lee, Gwangju (KR); Yong Woo Kim, Daejeon (KR)

(73) Assignees: SK Innovation Co., Ltd., Seoul (KR); SK Lubricants Co., Ltd., Seoul (KR)

( * ) Notice: Subject to any disclaimer, the term of this patent is extended or adjusted under 35 U.S.C. 154(b) by 0 days.

(21) Appl. No.: 14/885,165

(22) Filed: Oct. 16, 2015

(65) Prior Publication Data

US 2016/0108304 A1    Apr. 21, 2016

(30) Foreign Application Priority Data

Oct. 17, 2014 (KR) .................. 10-2014-0141074

(51) Int. Cl.
| | |
|---|---|
| *C09K 8/035* | (2006.01) |
| *C09K 8/34* | (2006.01) |
| *C11C 3/00* | (2006.01) |

(52) U.S. Cl.
CPC .............. *C09K 8/035* (2013.01); *C09K 8/34* (2013.01); *C11C 3/00* (2013.01); *C11C 3/003* (2013.01)

(58) Field of Classification Search
None
See application file for complete search history.

(56) References Cited

U.S. PATENT DOCUMENTS

| | | | |
|---|---|---|---|
| 4,964,615 A | 10/1990 | Mueller Heinz | |
| 5,198,012 A | 3/1993 | Iwasaki | |
| 6,018,063 A * | 1/2000 | Isbell | ................... C10M 101/04 508/460 |
| 6,054,415 A | 4/2000 | Gee et al. | |
| 6,776,234 B2 | 8/2004 | Boudreau | |
| 2008/0120899 A1 * | 5/2008 | Waynick | ................... C10L 1/02 44/388 |
| 2008/0217064 A1 | 9/2008 | Stoian | |
| 2011/0251445 A1 | 10/2011 | Takeuchi et al. | |
| 2012/0322897 A1 | 12/2012 | Bredsguard | |
| 2015/0144403 A1 † | 5/2015 | Forest | |

FOREIGN PATENT DOCUMENTS

| | | |
|---|---|---|
| EP | 527224 | 2/1993 |
| WO | 92/15548 | 9/1992 |
| WO | 2009/139003 A1 | 11/2009 |
| WO | 2011/037778 | 3/2011 |

OTHER PUBLICATIONS

Isbell, et al., "Industrial Crops and Products," 23(3): 256-263 (2006).
OL 700 Product Specification, Twin Rivers Technologies, Jun. 26, 2007.†

* cited by examiner
† cited by third party

*Primary Examiner* — Jeffrey Washville
(74) *Attorney, Agent, or Firm* — Abelman, Frayne & Schwab

(57) ABSTRACT

Disclosed is a method for producing a drilling fluid, comprising: a) preparing mixed fatty acids from a biomass-derived oil, b) subjecting the mixed fatty acids of step a) to an estolide reaction with a light acid to give an estolide, and c) esterifying the estolide of step b) with an alcohol to obtain the drilling fluid.

9 Claims, 1 Drawing Sheet

METHOD FOR PRODUCING DRILLING FLUID FROM BIOMASS-DERIVED OILS

RELATED APPLICATION

This application claims the benefit of Korean Patent Application No. 10-2014-0141074, filed on Oct. 17, 2014, entitled "Activated EU-2 Zeolite and Use Thereof", which is hereby incorporated by reference in its entirety into this application.

BACKGROUND OF THE INVENTION

1. Field of the Invention

The present invention relates to a method for producing a drilling fluid from biomass-derived oils. More particularly, the present invention relates to a method for producing a drilling fluid in an estolide form from oils and fats derived from naturally occurring biomass.

2. Description of the Related Art

Although strictly managed by refineries, petroleum resources are still the greatest sources that pollute the Earth's environment. Extraction of petroleum resources results in the exposure of petroleum reserves, such as S, N, heavy metals, aromatics, and so on, deposited deep in the earth to the earth surface. Lubricants produced by refining petroleum resources are of low biodegradability and, when introduced into the ecosystem, are likely to greatly affect the ecosystem. In practice, ecological disturbance frequently occurs due to chemicals. Oil spills, chemical spills, or silent-oil-spills frequently impact the ecosystem.

Hence, efforts have been made to substitute petroleum resources with environmentally friendly materials representative among which are biomass-derived oils and fats.

Biomass-derived oils and fats are primary products that are obtained, for example, by planting trees, allowing the trees to bear fruits, and squeezing the fruits. Because carbon atoms of biomass-derived oils and fats come from $CO_2$ preexisting in the Earth's atmosphere, the biomass-derived oils and fats, in contrast to fossil carbon-derived mineral oils, do not cause the addition of $CO_2$ to the Earth's atmosphere, but rather, decrease the $CO_2$ level of the Earth's atmosphere to contribute to the reduction of total $CO_2$ through the Earth's self purification. Therefore, biomass-derived oils and fats beneficially function for the Earth's self purification and participate in the reduction of total $CO_2$, which may allow bar increasing the tolerable usage of fossil fuels.

Drilling fluids were based on diesel in the past, but awareness of environmental problems has resulted in legal regulation that now requires drilling fluids to consist of 100% of environmentally friendly materials. With regard to diesels, biomass-derived, environmentally friendly diesels are also legally regulated worldwide to be used even at a rate of as low as ones %. In addition, the rate has tended to gradually increase.

A drilling fluid, also called boring mud, drilling mud, or just mud, is pumped through the drill string where it sprays out of nozzles on the drill bit in the process of drilling. The drilling fluid then mines the crushed or cut rock (cuttings) up the annular space between the drill string and the sides of the hole being drilled, up through the surface casing where it emerges back at the surface. The main functions of drilling fluids include (i) carrying out drill cuttings, (ii) keeping the drill bit and the drill siring cool, (iii) lubricating the drill string, and (iv) reacting against the infrastructural pressure of the borewell to prevent the wall of the bore well from collapsing.

Drilling fluids are largely classified into oil-based mud and synthetic-based fluid. Oil-based mud is a mud where the base fluid contains diesel oils, mineral oils, or other oils, without synthetic materials. Synthetic-based fluid is a mud where the base fluid is a synthetic oil prepared from a chemical material by reaction. For example, a synthesic-based fluid may be prepared by oligomerizing one or more olefin monomers in the presence of a metallocene catalyst (U.S. Pat. Nos. 5,198,012 and 6,054,415, and U.S. Patent Application No. 2011/0251445). In this regard, commercialized Chevron blends, prepared by a linear alpha-olefin process, are composed mainly of a mixture of 1-hexadecene (C16) and 1-octadecene (C18) with a ratio of 65/35 C16/C18 alpha-olefins.

In principle, drilling fluids should exhibit particular physical properties requisite for their functions. For example, density (specific gravity) is a physical property relevant to the function of allowing a column of the liquid to exactly mimic lithostatic stress within the ice as it varies with depth. Given a high pour point, a drilling fluid drastically increases in viscosity under low-temperature conditions (deep-sea drilling, oil drilling in polar regions, etc.) and is highly apt to excessively thickening. A drilling fluid with a low flash point retains a stability problem. Further, a drilling fluid cannot perform its inherent function of floating and transporting the cuttings to the surface when its viscosity is too low. On the other hand, an excessively high viscosity makes it difficult to pump the drilling fluid. Hence, the viscosity of the drilling fluid needs to be adjusted appropriately. However, such properties sometimes tend to counteract each other (e.g., an improvement in one property may be accompanied by the deterioration of another property), so that it is difficult for a single drilling fluid to simultaneously meet the required properties.

As regulations for drilling work conditions and environmental pollution become more stringent, drilling fluids are required not only to exhibit their inherent performances, but also to not cause problems to humans and the environment. However, conventional techniques have difficulty in minimizing negative environmental effects, such as non-biodegradability and/or toxicity. Inevitably retaining impurities of crude oil origin, such as polycyclic aromatics, transition metals, sulfur, nitrogen, halogen, etc., for example, oil-based drilling fluids require additional equipment or processing for removing such impurities. Synthetic-based drilling fluids, especially oligomerization products of olefins, have the potential problem of discharging the catalyst (e.g. boron trifluoride, etc.) used for the reaction as a toxic material. However, the United States Environmental Protection Agency (USEPA) applies strict standards to the regulation for biodegradability, sediment toxicity, heavy metal and polycyclic aromatic contents.

Various methods of manufacturing fuel oils such as gasoline or diesel from biomass are known, but applicability of biomass to drilling oil is not yet. Biomass contains few components that cause environmental pollution, and is composed exclusively of carbon, hydrogen and oxygen so that it is regarded advantageous in terms of preventing environmental pollution. Because drilling works are frequently earned out in cold regions in response to the increasing demand of crude oil, drilling fluids are required to be improved in low-temperature properties (particularly, pour point). Further, there is still a need fur an improvement in the basic properties of drilling fluids (e.g., flash point, specific gravity, viscosity, etc.).

From the initial time of their emergence, estolides were recognized as being applicable to use as lubricant oils (Group V, ester base oil) thanks to their structural characteristics. However, the triglyceride-derived estolides prepared the first time, although having a good pour point (PP 9 ~–36° C.), were not directly availed as lubricant fluids due to their poor oxidation stability (RPVOT 29~52 min). However, as a technique is provided for improving the oxidation stability by employing oleic acid as a feed and using partial hydrogenation and additives, there is a great likelihood that estolides will be available as raw materials for high-quality lubricant base oils and cosmetics.

Over petroleum-based Group I, Group II, and Group III base oils, conventional estolides have advantages in terms of viscosity index, oxidation stability, and heat stability, and are applicable to the production of high-quality lubricant base oils with Vis, greater than 100.

Such conventional estolides, produced for use as lubricant oils, are too large in molecular weight to function as drilling fluids. For example, their properties including viscosity at 40° C., specific gravity, flash point, etc. do not meet the standards required for drilling fluids. Conventional estolides, whether prepared directly from triglyceride or using oleic acid as a sole feed, are heavy hydrocarbons of 32 or more carbon atoms, and thus cannot be availed as diesel-like drilling fluids. General estolide products such as lubricant base oils are available as drilling fluids. However, these heavy hydrocarbons, although having good lubricant properties, are not regarded as high-quality drilling fluids due to their high frictional heat transmission and viscosity.

The technique of the present invention aims to produce a novel drilling fluid from a biomass-derived oils, which is in the form of estolide and exhibits properties similar to those of conventional drilling fluids. The estolides thus prepared can be availed as high-quality drilling fluids because they retain the excellent biodegradability and low-temperature properties of conventional estolides. When the use of mineral oil-derived drilling fluids are prohibited due to weather and environmental problems, the drilling fluids produced from biomass-derived oils or fats will act as an excellent alternative.

SUMMARY OF THE INVENTION

The present invention provides a method for producing a drilling fluid from an oils derived from biomass that contains almost no components causative of environmental pollution.

Also, the present invention provides a drilling fluid in the form of an estolide, which is produced by reacting a light acid with mixed fatty acids of a biomass-derived oils and is structurally quite different from conventional estolide products.

In accordance with an aspect thereof, the present invention provides a method for producing a drilling fluid, comprising a) preparing mixed fatty acids from a biomass-derived oils, b) subjecting the mixed fatty acids of step a) to an estolide reaction with a light acid to give an estolide, and c) esterifying the estolide of step b) with an alcohol to obtain the drilling fluid.

In one exemplary embodiment of the present invention, the biomass is animal biomass, vegetable biomass, or a combination thereof. Here, the animal biomass is selected from the group consisting of fish oil, beef tallow, lard, sheep tallow, butter, and a combination thereof, and the vegetable biomass is selected from the group consisting of sunflower seed oil, canola oil, palm oil, corn seed oil, cotton seed oil, rapeseed oil, linseed oil, safflower seed oil, oat oil, olive oil, palm oil, apricot seed oil, almond oil, avocado oil, olive oil, camellia oil, rice bran oil, cotton seed oil, peanut oil, walnut oil, rapeseed oil, rice bran oil, linseed oil, sesame oil, soybean oil, castor oil, cocoa butter, palm kernel oil, and a combination thereof.

In another exemplary embodiment of the present invention, the mixed fatty acids may contain a C16 fatty acid, a C18 fatty acid, or a combination thereof in an amount of at least 80% by weight, and each of the mixed fatty acids may range in length from 4 to 24 carbon atoms.

In another exemplary embodiment of the present invention, the mixed fatty acids may be fatty acids derived from triglyceride of the biomass by de-esterification.

In another exemplary embodiment of the present invention, the mixed fatty acids may be a palm fatty acid distillate (PFAD) or a soy fatty acid distillate (SFAD), both being derived from biomass.

In another exemplary embodiment of the present invention, the light acid may be a volatile acid. Here, the light acid may be acetic acid or propionic acid.

In another exemplary embodiment of the present invention, the method may further comprise d) separating the mixed fatty acid-derived estolide into C18:1-, C18:2-, and C18:3-derived estolide (ester) products.

In accordance with another aspect thereof the present invention provides a drilling produced according to the method of the present invention. The drilling fluid may be in mixture of compounds represented by the following Chemical Formulas 1 to 4:

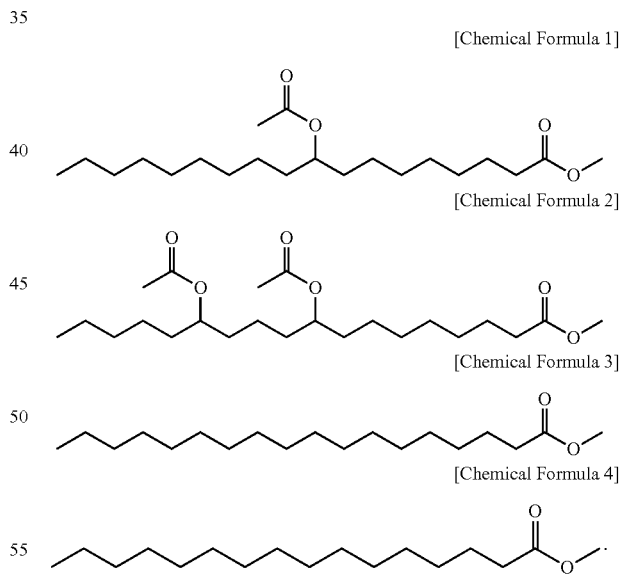

[Chemical Formula 1]

[Chemical Formula 2]

[Chemical Formula 3]

[Chemical Formula 4]

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinbelow, preferred embodiments of the present invention will be described in detail with reference to the accompanying drawings. In the following description, it is to be noted that, when the functions of conventional elements and the detailed description of elements related with the present invention may make the gist of the present invention unclear, a detailed description of those elements will be omitted.

An aspect of the present invention addresses a method for producing a drilling fluid, comprising: a) preparing mixed fatty acids from biomass-derived oils and fats, b) subjecting the mixed fatty acids of step a) and a light acid to an estolide reaction to give an estolide, and c) esterifying the estolide of step b) with an alcohol to obtain the drilling fluid.

Figure 1:
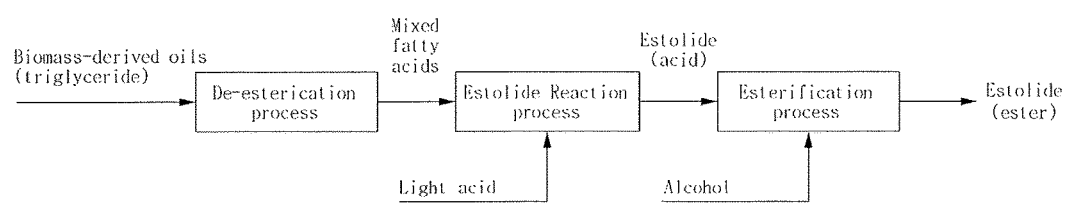
FIG. 1 is a schematic view illustrating serial processes of producing a drilling fluid according to an exemplary embodiment of the present invention.

In an exemplary embodiment of the present invention, as illustrated in FIG. 1, a biomass-derived oils (including triglyceride) was decomposed into mixed acids by de-esterification, and the mixed fatty acids are subjected to an estolide reaction with a light acid to give an estolide in an acid form. Then, the estolide in an acid form is esterified with an alcohol to produce an estolide in an ester form. The estolide in an ester form can be used as a drilling fluid.

In biomass-derived oils or fats, triglycerides are predominant over other components, and are composed mainly of C16 and C16 carbon chains inclusive of ester carbon atoms. The C15 carbon chains are, for the most part, saturated fatty acids while most of the C18 carbon chains are unsaturated. The triglycerides of biomass-derived oils and fats can be converted into fatty acids by de-esterification, which can be achieved using an acid, a base, and high-temperature steam only.

The mixed fatty acids are subjected to an estolide reaction with a light acid, especially a volatile fatty acid, which can be readily obtained through the fermentation of an organic material, to give an estolide in an acid form.

Since it has a carboxylic acid as a functional group, the acid form is converted into a more stable ester form through acid-catalyzed esterification with an alcohol.

Originating from mixed C16 and C18 fatty acids, the estolide (ester) is in a mixed form. In addition, the obtained estolide (ester) satisfies all the properties requisite for use as a drilling fluid.

As the light acid, a volatile acid, such as acetic acid, propionic acid, etc., is available. Useful in the present invention is a lower alcohol such as methanol, ethanol, etc. Alternatively, an alcohol in a branch-chain form may be employed in order to increase the structural stability of the estolide. Examples of the branch-chain type alcohol include 2-methyl octanol and 2,4-dimethyl hexanol.

Since they are, for the most part, saturated fatty acids, the C16 fatty acids cannot he converted into estolides (ester). As needed, C16 fatty acids can be separated. When C16 fatty acid-derived FAME is filtered off, the remaining C18 fatty acid-derived estolide (ester) as a drilling fluid greatly decreases in pour point. If necessary, the mixed C18 fatty acid-derived estolide (ester) may be further separated into C18:1-, C18:2-, and C18:3-derived estolide (ester) products. The pour point is the highest for C18:1 and decreases in the order of C18:2 and C18:3.

Additional isolation processes are necessary for producing separate products of the estolides. For an economical benefit, the mixed estolides themselves may be used as a drilling fluid, without separation. In order to obtain higher quality drilling fluids, the mixed estolides may be separated into C18:1, C18:2, and C18:3 as mentioned above. The more the estolide bonds are, the lower the pour point is. Thus, a drilling fluid with more estolide bonds is of higher quality. The separation may be achieved by vacuum distillation. On the whole, estolides with estolide bonds are separated at higher temperatures.

The reactions useful in the present invention will be explained in detail in the following.

Production of Mixed Fatty Acids from Biomass-derived Oils

[De-esterification Process]

In one exemplary embodiment of the present invention, fatty acids may be obtained from various animal and vegetable oils and fats known in the art. Illustrative among the animal oils and fats are fish oils, beef tallow, lard, sheep tallow, and butter. Examples of the vegetable oils and fats include sunflower seed oil, canola oil, palm oil, corn seed oil, cotton seed oil, rapeseed oil, linseed oil, safflower seed oil, oat oil, olive oil, palm oil, peanut oil, apricot seed oil, almond oil, avocado oil, olive oil, camellia oil, rice bran oil, cotton seed oil, peanut oil, walnut oil, rapeseed oil, rice bran oil, linseed oil, sesame oil, soybean oil, castor oil, cocoa butter, and palm kernel oil, but are not limited thereto. The oils and fats may be used alone or in combination. Kinds of biomass available in the present invention are listed, together with the fatly acids contained therein (or derived therefrom) and their contents, in Tables 1 and 2, below.

TABLE 1

| Fatty Acid | Soy bean oil | Corn oil | Cotton seed oil | Sunflower seed oil | Peanut oil | Olive oil | Rapeseed oil |
|---|---|---|---|---|---|---|---|
| 14:0 Myristic acid | 0.4 | <0.1 | 0.4-2.0 | <0.5 | <0.4 | 0.05 | <1.0 |
| 16:0 Palmitic acid | 7□14 | 8□9 | 17□31 | 3□10 | 6.0□16 | 7.5□20 | 1.5□6.4 |
| 16:1 Palmitoleic acid | <0.5 | <0.5 | 0.5□2.0 | <1.0 | <1.0 | 0.3□3.5 | <3.0 |
| 18:0 Stearic acid | 1.4□5.5 | 0.5□4.0 | 1.0□4.0 | 1.0□10 | 1.3□6.5 | 0.5□3.5 | 0.5□3.1 |
| 18:1 Oleic acid) | 19□30 | 19□50 | 13□44 | 14□65 | 35□72 | 56□83 | 8□45 |
| 18:2 Linoleic acid) | 44□62 | 34□62 | 33□59 | 20□75 | 13□45 | 3.5□20 | 11□29 |
| 18:3 Linolenic acid | 4.0□11 | <2.0 | 1.0□2.1 | <0.7 | <1.0 | <1.5 | 5□16 |
| 20:0 Eicosanoic acid | <1.0 | <1.0 | <0.7 | <1.5 | 1.0□3.0 |  | <3.0 |
| 20:1 Eicosanoic acid | <1.0 | <0.5 | <0.5 | <0.5 | 0.5□2.1 |  | 3□15 |
| 22:0 Docosanoic acid |  | <0.5 | <0.5 | <1.0 | 1.0□5.0 |  | <2.0 |

TABLE 1-continued

| Fatty Acid | Soy bean oil | Corn oil | Cotton seed oil | Sunflower seed oil | Peanut oil | Olive oil | Rapeseed oil |
|---|---|---|---|---|---|---|---|
| 22:1 Erucic acid | | | <0.5 | <0.5 | <2.0 | | 5□60 |
| 24:0 Tetracosanoic acid | | <0.5 | <0.5 | <0.5 | 0.5□3.0 | | <2.0 |
| 24:1 Tetracosenoic acid | | | | <0.5 | | | |

TABLE 2

| Fatty Acid | Cocoa butter | Palm Oil | Palm Kernel Oil | Coconut Oil | Butter | Lard | Beef Tallow |
|---|---|---|---|---|---|---|---|
| 4:0 Butyric acid | | | | | 3.6 | | |
| 6:0 Caproic acid | | | <0.5 | <1.2 | 2.2 | | |
| 8:0 Caprylic acid | | | 2.4□6.2 | 3.4□15 | 1.2 | | |
| 10:0 Capric acid | | | 2.6□7.0 | 3.2□15 | 2.8 | | |
| 12:0 Lauric acid | | <1.2 | 41□55 | 41□56 | 2.8 | | |
| 14:0 Myristic acid | 0.1 | 0.5□5.9 | 14□20 | 13□23 | 10.1 | 2.0 | 2.5 |
| 14:1 Myristoleic acid | | | | | | | 3.0 |
| 16:0 Palmitic acid | 26.0 | 32□59 | 6.5□11 | 4.2□12 | 25.0 | 27.1 | 27.0 |
| 16:1 Palmitoleic acid | 0.3 | <0.6 | 1.3□3.5 | 1.0□4.7 | 2.6 | 4.0 | 10.8 |
| 18:0 Stearic acid | 34.4 | 1.5□8.0 | 10□23 | 3.4□12 | 12.1 | 11.0 | 7.4 |
| 18:1 Oleic acid | 34.8 | 27□52 | 0.7□54 | 0.9□3.7 | 27.1 | 44.4 | 47.5 |
| 18:2 Linoleic acid | 3.0 | 5.0□14 | | | 2.4 | 11.4 | 1.7 |
| 18:3 Linolenic acid | 0.2 | <1.5 | | | 2.1 | | 1.1 |
| 20:0 Eicosanoic acid | 1.0 | <1.0 | | | | | |
| 22:0 Docosanoic acid | 0.2 | | | | | | |

As shown in Tables 1 and 2, biomass derived from various animals and plants have fatty acids of 4 to 24 carbon atoms, particularly with the enrichment of fatty acids of 16 or 18 carbon atoms. For example, the content of fatty acids of 16 and/or 18 carbon atoms in the total fatty acids may be about 80% by weight, particularly, at least about 85% by weight, and more particularly about 90 to 99% by weight.

Of course, biomass may contain fatty acids with various numbers of carbon atoms, according to its origin. For example, palm has a weight ratio of about 1:1 C16:C18 fatty acid while soybean oil has a weight ratio of about 1:6 C16:C18 fatty acids.

As described above, biomass-derived oils and fats are composed mostly of triglycerides and fatty acids. In triglyceride, three fatty acids exist, each forming an ester bond to the glycerol frame. In this regard, ratios of triglyceride: fatty acid (weight) may be, for example, about 100:1 to 6:1, particularly about 20:1 to 6:1, and more particularly about 10:1 to 6:1, but may vary depending on the source of biomass. Accordingly, the present invention is not limited by the numerical ranges. More typically, triglyceride may account for about 90 to 95% by weight of the biomass-derive oils.

In addition, each chain of the triglyceride has a length of 4 to 24 carbon atoms, and more typically 16 or 18 carbon atoms. The triglyceride or some mono- or diglyceride may be converted into C16 and C18 mixed fatty acids through de-esterification, as illustrated in the following Reaction Scheme 1.

[Reaction Scheme 1]

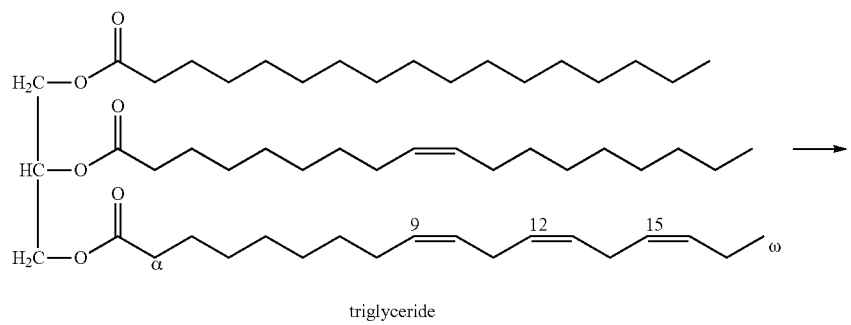

triglyceride

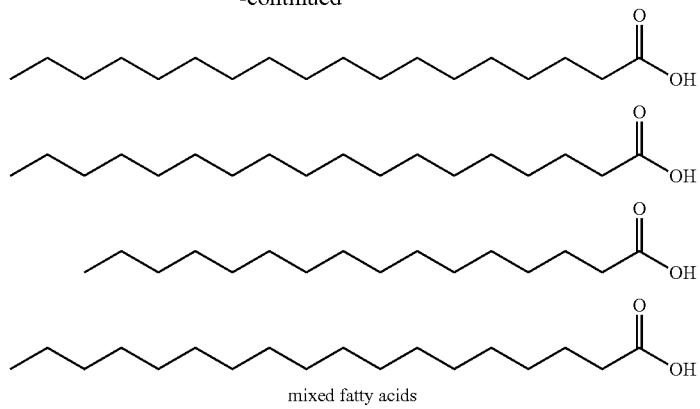
mixed fatty acids

The de-esterification reaction illustrated above is a typical reaction for producing FAME (fatty acid methyl ester) from biomass.

According to an exemplary embodiment, the de-esterification may be carried out in the presence of a strong acid (for example, H2SO4, HNO3, HCl, HBr, HI, HClO4, HClO3, HBrO4, HBrO3, HIO4, HIO3, etc.) or a strong base (for example, NaOH, KOH, Ca(OH)2, amine compounds, etc.) or under the provision of high-temperature (typically, about 100 to 300° C., and more typically about 100 to 200° C.) steam to convert triglyceride into fatty acids. In addition, any reaction that is known in the art to convert triglyceride into fatty acids may be used without limitations.

An important consideration in providing fatty acids via Reaction Scheme 1 is the selection of biomass materials. Although any biomass oils may be employed, the biomass material that satisfies the condition of production in a commercially applicable quantity, the formation of a commercially available market, and stable price volatility is preferred. For this, CPO (Crude palm oil) and SBO (Soybean oil) may be used. Since these biomass materials are produced in hundreds of tons per year, with the trade volume of one hundred tons or more through the open market, a commercially applicable amount of the materials can be stably secured. Particularly, the materials contain triglycerides composed mostly of C16 and C18 chains. For example, the ratio of C16/18 approximates 1 in CPO and 0.25 in SBO. For use in special purposes (e.g., food, cosmetics, etc.), only triglycerides are separated from the materials. The remainder is a fatty acid distillate composed mostly of fatty acids (typically, fatty acids 90% or higher). The remainder that is free of the triglyceride RBD (refined, bleached, deodorized) palm oil in CPO may be called PFAD (palm fatty acid distillate), and the remainder that is free of triglycerides in SBO may be called SFAD (soy fatty acid distillate). These fatty acid distillates as byproducts generated during the purification of triglycerides have been traded at relatively low price because of their limited use.

Estolide Reaction

Structures and uses of estolides are as described above. Typically, the production of estolides is achieved using acid-catalyst reactions. Mostly, strong acids such as H2SO4, HClO4, etc. are used for these reactions. A moderate acid, such as formic acid, may be available, but requires a more stringent condition. Reactions for producing estolides are not progressed as rapidly as oligomerization or alkylation. Thus, reaction conditions under which estolides are produced at high yield without side reactions are taken although taking a long period of time. In this regard, acidity, acid amounts, temperatures as well as reaction times and stirring speeds are suggested as important experimental parameters for estolide reactions. Estolides can be produced within several hours, but at low yield, and thus the reaction time are typically maintained for 12 hrs or longer. Also, the stirring speed is a very important factor. A higher stirring speed is known to lead to a better reaction. Important is the reaction pressure, as well. As a rule, the production of estolides is conducted at a low pressure so as to prevent the products from undergoing a color change and to increase the yield. In this case, however, there is a burden that vacuum equipment be needed.

The temperature of the estolide reaction varies depending on vacuum, and is typically set to be −20~30° C. When the catalyst is a strong: acid catalyst, it is used in an amount of 1~10 wt % of the feed. When the catalyst is not a strong acid, for example, a cationic catalyst such as zeolite, clay, etc., it may be introduced in an amount of about 0.05~80 wt %. The estolide reaction may be typically conducted for about 0.5~48 h at about 50~2000 rpm.

The use of a light acid is the most distinct difference in estolide production between the present invention and conventional techniques. Even in the presence of a light acid, typical estolide reaction conditions and processes are used.

Esterification.

The estolide in an acid form is stabilized into an ester form For the esterification, an alcohol such as methanol may be used. In order to increase steric hindrance, branched alcohol may be employed. The alcohol may be introduced in an excessive amount, and typically in an amount 1-~100-fold larger than the acid (basis of mol %). This esterification requires a strong acid catalyst H2SO4 as in the estolide reaction, and is typically conducted at 100° C. or less. Acid-catalyzed esterification is rapidly conducted and typically completed within 6 hours. Stirring is also helpful in promoting the reaction, and may be set to be a certain level such as 200 rpm or higher. A branch-chain alcohol may be employed to increase the structural stability of the estolide.

A better understanding of the present invention may be obtained through the following examples which are set forth to illustrate, but are not to be construed as the limit of the present invention.

EXAMPLE 1

Analysis of Feed

Figure 2:
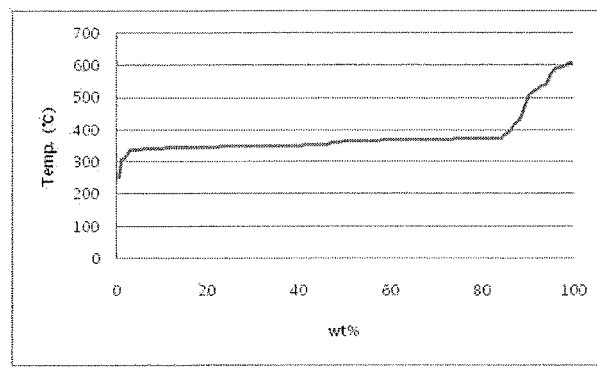
FIG. 2 is a SimDist graph illustrating the composition of PFAD, used as a feed to produce estolides.

As a feed for estolide production, PFAD, which is an inexpensive biomass-derived oils by-product, was used. The PFAD to be used was analyzed for composition by SimDist analysis, and the results are given in FIG. 2.

The analysis showed the composition of PFAD as in Table 3, below.

TABLE 3

| Fatty acid | PFAD(wt %) |
| --- | --- |
| 14:0 myristic acid | 3 |
| 16:0 palmitic acid | 43 |
| 18:1, 18:2, 18:3 Oleic acid, linoleic acid, linoleinic acid | 38 |
| mono-, di-glyceride | 16 |
| Total | 100 |

Production of Estolide Through Estolide Reaction and Esterification

Into a 2 L autoclave was introduced 227 g of PFAD, followed by slowly adding a mixture of 201 g of acetic acid and 23 g of sulfuric acid. The resulting mixture was slowly heated at a rate of 2° C./min to 200° C. while being stirred at 300 rpm. Under these conditions, the reaction was maintained far 24 hrs. After completion of the reaction, the temperature was decreased to 35° C., and acidity was monitored with an aqueous KOH/ethanol mixture (KOH/EtOH/DI-water=0.1 g/30 g/1975 g). When no acids were observed to remain in the reaction mixture, the reaction mixture was introduced into in a separatory funnel.

When layer separation occurred in the separatory funnel, the aqueous layer containing salts, acids, and alcohols was separated from the organic layer and removed. Then, remaining salts and acids were removed from the organic layers, using 2 L deionized water. The organic layer weighed 183 g, and was rectified at a cutoff of 490° C. using a fractional distillation apparatus (Spaltrohr HMS 300 C; Fischer technology) to isolate an estolide material of fatty acid itself. The fraction recovered at 490° C. or less weighed 72 g.

To 72 g of the fraction with a boiling point of 490° C. or less were added 263 g of methanol and 18 g of sulfuric acid. While being stirred at 500 rpm, the mixture was heated at 2° C./min to 65° C. and then maintained at the temperature for 3 hrs. After completion of the reaction, the reaction mixture was cooled to room temperature, and measured for acidity using an aqueous KOH/ethanol solution (KOH/EtOH/DI-water=0.1 g/30 g/1975 g). When observed to contain no remaining acids, the reaction mixture was introduced into in a separatory funnel.

Once layer separation occurred in the separatory funnel, the aqueous layer containing salts, acids, and alcohols was separated from the organic layer and removed. Then, remaining salts and acids were removed from the organic layers, using 2 L deionized water. The resulting organic layer weighed 80 g.

Analysis of Estolide for Physical Property

To examine whether the estolide is suitable for use as a drilling fluid, its physical properties were analyzed, and the results are summarized in Table 4, as follows.

TABLE 4

| Property | Condition for Drilling Fluid (Diesel type) | Product |
| --- | --- | --- |
| 1. Flash point: | 85° C. or higher (higher is better) | >130° C. |
| 2. Pour point: | less than −5° C. ~~or less~~ (lower is better) | −8° C. |
| 3. Specific gravity: | 0.77~0.81 | 0.90~0.99 |
| 4. Viscosity: | 1.9~3.5 cSt @ 40° C. | 2.5~4.0 cSt |
| 5. Free of aromatics such as PAH, BTX, etc. | | No aromatics |
| 6. Toxicity, biodegradability | | — |

As can be seen in Table 3, the estolide prepared in Example 1 was observed to have a high flash point, meet the standard for pour point, and contain no aromatics (TAH). However, its specific gravity and viscosity were slightly higher than the standards. This seems to be attributed to the fact that the estolide somewhat increases in molecular weight and oxygen content with the change of estolide from acid form to ester form.

Therefore, the estolide produced according to the present invention, although remained to meet some required conditions, has a strong potential for use as a diesel-type drilling fluid, and the significance of being produced from a biomass-derived oils. Although not examined for biodegradability, the drilling fluid in the form of estolide can be expected to be highly biodegradable because estolide lubricant oils are known to have a biodegradability of 70% or higher as analyzed by CEC.

As described above, the drilling fluid produced according to one embodiment of the present invention meets all the standards of physical properties required for use as a drilling fluid, and has a great significance that it is derived from biomass.

In addition, mixed fatty acids obtained from biomass-derived oils and fats are utilized as they are, without additional processes of separation and purification. In addition, the method of the present invention uses a light acid and a low alcohol in producing the drilling fluid, and thus is economically beneficial. Existing as a form of estolide ester, the final drilling fluid is highly biodegradable and has a low pour point.

The drilling fluid according to the present invention is exclusive of fatty acid dimers, trimers, and tetramers, and meets the conditions required for a diesel-type drilling fluid so that it exhibits excellent flash point and viscosity properties.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for producing a drilling fluid, comprising:
   a) preparing mixed fatty acids from a biomass-derived oil and fat,
   b) subjecting the mixed fatty acids of step a) to an estolide reaction with a light acid to give an estolide,
   c) esterifying the estolide of step b) with an alcohol to afford the drilling fluid, and
   d) separating the mix fatty acid-derived estolide into C18:1-, C18:2-, and C18:3-derived estolide (ester) products.

2. The method of claim 1, wherein the biomass is animal biomass, vegetable biomass, or a combination thereof.

3. The method of claim 2, wherein the animal biomass is selected from the group consisting of fish oil, beef tallow, lard, sheep tallow, butter, and a combination thereof, and the vegetable biomass is selected from the group consisting of sunflower seed oil, canola oil, palm oil, corn seed oil, cotton seed oil, rapeseed oil, linseed oil, safflower seed oil, oat oil, olive oil, palm oil, apricot seed oil, almond oil, avocado oil, olive oil, camellia oil, rice bran oil, cotton seed oil, peanut oil, walnut oil, rapeseed oil, rice bran oil, linseed oil, sesame oil, soybean oil, castor oil, cocoa butter, palm kernel oil, and a combination thereof.

4. The method of claim 1, wherein the mixed fatty acids contain a C16 fatty acid, a C18 fatty acid, or a combination thereof in an amount of at least 80 by weight.

5. The method of claim 1, wherein each of the mixed fatty acids ranges in length from 4 to 24 carbon atoms.

6. The method of claim 1, wherein the mixed fatty acids are fatty acids derived from triglyceride of the biomass by de-esterification.

7. The method of claim 1, wherein the mixed fatty acids are a palm fatty acid distillate (PF AD) or a soy fatty acid distillate (SFAD), both being derived from biomass.

8. The method of claim 1, wherein the light acid is acetic acid or propionic acid.

9. The method of claim 1, wherein the light acid is a volatile acid.

* * * * *